(12) United States Patent
Zeng et al.

(10) Patent No.: US 12,537,460 B2
(45) Date of Patent: Jan. 27, 2026

(54) RADIO FREQUENCY RECTIFIER CIRCUIT AND ELECTRONIC PAPER DISPLAY APPARATUS

(71) Applicant: E Ink Holdings Inc., Hsinchu (TW)

(72) Inventors: Zi-Yu Zeng, Hsinchu (TW); Tzu-Hsien Yang, Hsinchu (TW); Chong-Sin Huang, Hsinchu (TW); Zheng-Lun Huang, Hsinchu (TW); Ke-Horng Chen, Hsinchu (TW); Pin-Cheng Chiu, Hsinchu (TW); Chuen-Jen Liu, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 918 days.

(21) Appl. No.: 17/749,173

(22) Filed: May 20, 2022

(65) Prior Publication Data

US 2023/0021750 A1 Jan. 26, 2023

(30) Foreign Application Priority Data

Jul. 14, 2021 (TW) .................................. 110125780

(51) Int. Cl.
*H02M 7/217* (2006.01)
*H03K 5/24* (2006.01)

(52) U.S. Cl.
CPC .............. *H02M 7/217* (2013.01); *H03K 5/24* (2013.01)

(58) Field of Classification Search
CPC ........ H02M 7/217; H02M 7/219; H02J 50/20; H02J 50/001
See application file for complete search history.

(56) References Cited

U.S. PATENT DOCUMENTS

| | | | |
|---|---|---|---|
| 8,115,597 B1* | 2/2012 | Oliver | G06K 19/0713 340/10.41 |
| 9,232,475 B2 | 1/2016 | Heinzelman et al. | |
| 9,287,717 B2* | 3/2016 | Amma | H02J 50/10 |
| 9,800,094 B2 | 10/2017 | Liu et al. | |
| 10,044,290 B2 | 8/2018 | Finocchiaro et al. | |
| 10,713,549 B1* | 7/2020 | Peach | H03K 17/102 |
| 10,797,537 B2 | 10/2020 | Chowdhury et al. | |

(Continued)

FOREIGN PATENT DOCUMENTS

| | | |
|---|---|---|
| CN | 111383605 | 7/2020 |
| TW | 201325311 | 6/2013 |

(Continued)

OTHER PUBLICATIONS

"Office Action of Taiwan Counterpart Application", issued on May 31, 2022, p. 1-p. 3.

*Primary Examiner* — Gustavo A Rosario-Benitez
(74) *Attorney, Agent, or Firm* — JCIPRNET (57) ABSTRACT

A radio frequency rectifier circuit including a rectifier circuit and a controller circuit is provided. The rectifier circuit receives a radio frequency signal and converts the radio frequency signal into a direct-current voltage serving as an output voltage. The rectifier circuit includes multiple power stages and multiple switch circuits. Each of the switch circuits is coupled between two of the power stages. The controller circuit is coupled to the rectifier circuit. The controller circuit outputs a control signal to control a conduction number of the switch circuits according to a value of the output voltage.

9 Claims, 4 Drawing Sheets

(56) References Cited

U.S. PATENT DOCUMENTS

| | | | |
|---|---|---|---|
| 11,188,803 B1* | 11/2021 | Patil | G06K 19/0723 |
| 2013/0299593 A1* | 11/2013 | Glidden, III | G06K 19/0713 |
| | | | 363/125 |
| 2015/0311707 A1* | 10/2015 | Ikenaga | H02J 50/40 |
| | | | 307/71 |
| 2016/0301257 A1* | 10/2016 | Parks | H02J 50/20 |
| 2018/0131231 A1* | 5/2018 | Nakano | H02J 50/80 |
| 2018/0287507 A1* | 10/2018 | Yamada | G06K 19/0723 |
| 2018/0316225 A1* | 11/2018 | Yeo | H02J 50/12 |
| 2018/0366981 A1* | 12/2018 | Liao | H02J 50/20 |
| 2021/0194291 A1* | 6/2021 | Yeo | H02M 7/25 |

FOREIGN PATENT DOCUMENTS

| | | |
|---|---|---|
| TW | 201408127 | 2/2014 |
| TW | 201606739 | 2/2016 |
| TW | 202015488 | 4/2020 |
| WO | 2014139154 | 9/2014 |

* cited by examiner

RADIO FREQUENCY RECTIFIER CIRCUIT AND ELECTRONIC PAPER DISPLAY APPARATUS

CROSS-REFERENCE TO RELATED APPLICATION

This application claims the priority benefit of Taiwan application serial no. 110125780, filed on Jul. 14, 2021. The entirety of the above-mentioned patent application is hereby incorporated by reference herein and made a part of this specification.

BACKGROUND

Technical Field

The disclosure relates to a rectifier circuit and a display device, and in particular to a radio frequency rectifier circuit and an electronic paper display apparatus.

Description of Related Art

Using energy harvesting to obtain energy in nature without relying on batteries or power source input has become a research trend in recent years. However, the technology is still developing and thus cannot be widely used. Traditional Internet of Things (IoT) devices and sensors thereof, when not connected to electrical wires, must rely on batteries to provide power. As a result, the use time of the devices is limited, and replacement of batteries for many devices causes inconvenience. Therefore, a radio frequency energy harvesting system is the best solution for the current IoT system. However, since there are diverse radio frequency signals in the environment, a current method of harvesting this energy is restricted when the distance of using a radio frequency signal is uncertain.

A radio frequency signal becomes a direct-current voltage after conversion. However, the direct-current voltage varies greatly with the distance between the radio frequency signal and an antenna. Therefore, the amount of energy provided fluctuates greatly, affecting the use of power supply for a subsequent system. In addition, the efficiency of receiving energy from the radio frequency signal source is also a major focus in the field.

SUMMARY

The disclosure provides a radio frequency rectifier circuit and an electronic paper display apparatus, which have an automatic configuration switching function that improves the efficiency of energy use.

The radio frequency rectifier circuit of the disclosure includes a rectifier circuit and a controller circuit. The rectifier circuit is used to receive a radio frequency signal and convert the radio frequency signal into a direct-current voltage serving as an output voltage. The rectifier circuit includes a plurality of power stages and a plurality of switch circuits, and each of the switch circuits is coupled between two of the power stages. The controller circuit is coupled to the rectifier circuit. The controller circuit is used to output a control signal to control a conduction number of the switch circuits according to a value of the output voltage.

In an embodiment of the disclosure, when an initial voltage of the output voltage is greater than or equal to a first default value, the controller circuit controls a part of the switch circuits to be conducted to reduce the output voltage.

In an embodiment of the disclosure, when the output voltage changes up and down from the first default value and is greater than or equal to the first default value, the controller circuit reduces the conduction number of the switch circuits to reduce the output voltage.

In an embodiment of the disclosure, when an initial voltage of the output voltage is less than a first default value, the controller circuit controls all of the switch circuits to be conducted.

In an embodiment of the disclosure, when the output voltage is greater than or equal to a second default value, the controller circuit controls all of the switch circuits to be conducted. The second default value is less than the first default value.

In an embodiment of the disclosure, when the output voltage is less than the second default value, the controller circuit controls all of the switch circuits to be conducted.

In an embodiment of the disclosure, each of the above-mentioned power stages includes a first end, a second end, and a third end. The first end of the power stage is coupled to a first switch circuit. The second end of the power stage is coupled to a second switch circuit. The third end of the power stage is coupled to the radio frequency signal. The switch circuits include the first switch circuit and the second switch circuit, and the first switch circuit and the second switch circuit are two adjacent switch circuits.

In an embodiment of the disclosure, each of the above-mentioned power stages includes a plurality of native transistors coupled in series to perform an AC-to-DC conversion operation.

In an embodiment of the disclosure, each of the above-mentioned switch circuits includes a first end, a second end, a third end, and a control end. The first end of the switch circuit is coupled to a first power stage. The second end of the switch circuit is coupled to a second power stage. The third end of the switch circuit is coupled to the output voltage. The control end of the switch circuit is coupled to the control signal. The power stages include the first power stage and the second power stage, and the first power stage and the second power stage are two adjacent power stages.

In an embodiment of the disclosure, each of the aforementioned controller circuits includes a comparator circuit, a counter circuit, and a digital logic control circuit. The comparator circuit is used to compare the output voltage with at least one default value to output at least one comparison signal. The counter circuit is coupled to the comparator circuit. The counter circuit is used to output count signal. The comparator circuit uses the comparison signal to trigger or reset the counter circuit. The digital logic control circuit is coupled to the counter circuit. The digital logic control circuit is used to output the control signal according to the count signal.

In an embodiment of the disclosure, the above-mentioned rectifier circuit outputs the output voltage serving as an operating voltage of an electronic paper display apparatus.

An electronic paper display apparatus of the disclosure includes the radio frequency rectifier circuit. The radio frequency rectifier circuit receives a radio frequency signal and converts the radio frequency signal into a direct-current voltage serving as an operating voltage of the electronic paper display apparatus.

Based on the above, in the embodiments of the disclosure, the controller circuit controls the conduction number of the switch circuits according to the value of the output voltage. Therefore, the rectifier circuit automatically switches between configurations to improve the efficiency of energy use.

DESCRIPTION OF THE EMBODIMENTS

Figure 1:
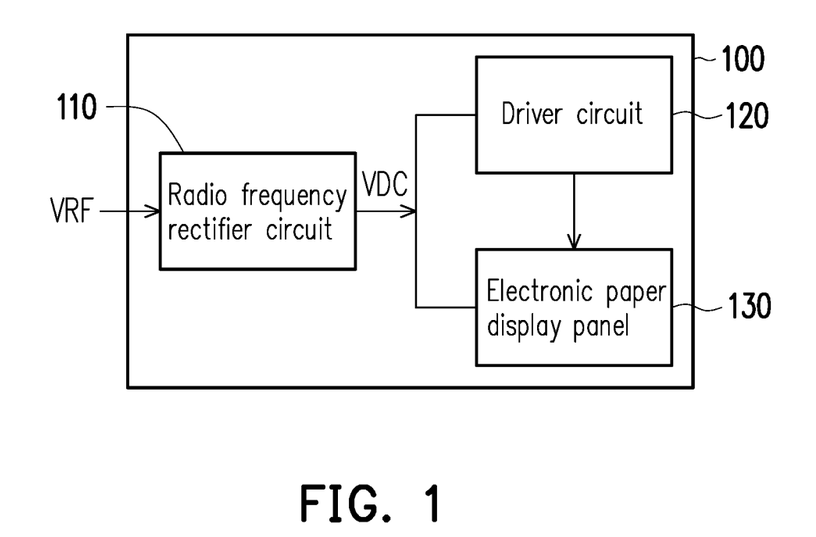
FIG. 1 illustrates a schematic diagram of an electronic paper display apparatus according to an embodiment of the disclosure.

FIG. 1 illustrates a schematic diagram of an electronic paper display apparatus according to an embodiment of the disclosure. Referring to FIG. 1, an electronic paper display apparatus 100 of this embodiment includes a radio frequency rectifier circuit 110, a driver circuit 120, and an electronic paper display panel 130. The driver circuit 120 is used to drive the electronic paper display panel 130 to display images. When the electronic paper display apparatus 100 is applied to an Internet of Things (IoT) system, the radio frequency rectifier circuit 110 serves as a radio frequency energy harvesting system which may be used to receive a radio frequency signal VRF and convert the radio frequency signal VRF into a direct-current voltage VDC serving as the operating voltage of the electronic paper display apparatus 100. This operating voltage may be used for the operation of the driver circuit 120 or the electronic paper display panel 130.

In this embodiment, sufficient teaching, suggestions, and implementation description of the implementation of the driver circuit and the electronic paper display panel may be obtained from the common knowledge in the technical field.

Figure 2:
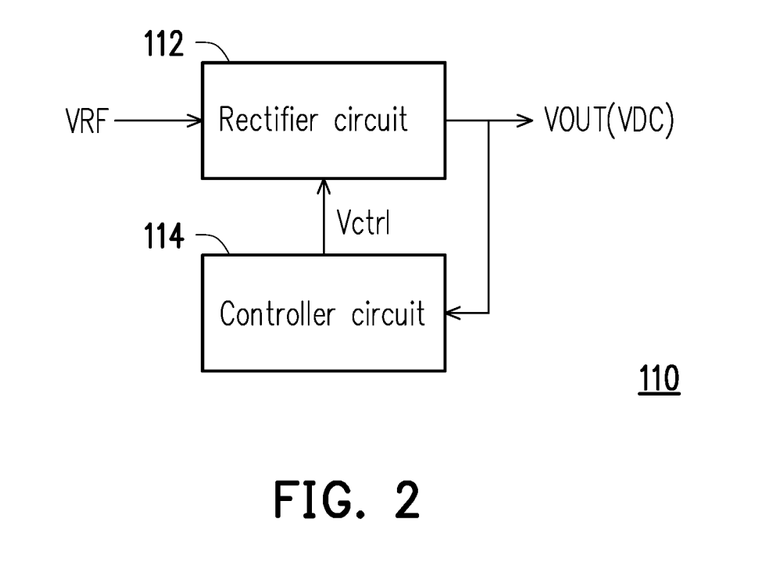
FIG. 2 illustrates a schematic diagram of a radio frequency rectifier circuit according to an embodiment of the disclosure.
Figure 3:
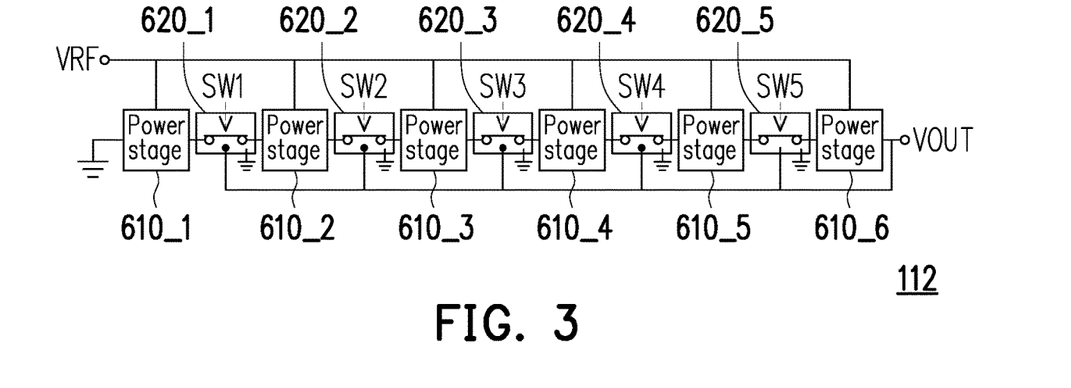
FIG. 3 illustrates a schematic diagram of a rectifier circuit of the embodiment of FIG. 2.

FIG. 2 illustrates a schematic diagram of a radio frequency rectifier circuit according to an embodiment of the disclosure. FIG. 3 illustrates a schematic diagram of a rectifier circuit of the embodiment of FIG. 2. Referring to FIGS. 2 and 3, the radio frequency rectifier circuit 110 of this embodiment includes a rectifier circuit 112 and a controller circuit 114. The rectifier circuit 112 is used to receive the radio frequency signal VRF and convert the radio frequency signal VRF into the VDC direct-current voltage serving as an output voltage VOUT. The rectifier circuit 112 includes a plurality of power stages 610_1, 610_2, 610_3, 610_4, 610_5, 610_6 and a plurality of switch circuits 620_1, 620_2, 620_3, 620_4, 620_5. Each switch circuit is coupled between two power stages. For example, the switch circuit 620_1 is coupled between the power stages 610_1 and 610_2. In this embodiment, the number of power stages and switch circuits is for illustration only, and is not used to limit the disclosure.

The controller circuit 114 is coupled to the rectifier circuit 112. The controller circuit 114 is used to output a control signal Vctrl to control the conduction number of the switch circuits 620_1 to 620_5 according to the value of the output voltage VOUT. In this embodiment, the control signal Vctrl includes control signals SW1, SW2, SW3, SW4, and SW5, which are respectively used to control the conduction status of the switch circuits 620_1 to 620_5. For example, when the control signal SW1 is logic 0, the switch circuit 620_1 may be controlled to be conducted; when the control signal SW1 is logic 1, the switch circuit 620_1 may be controlled not to be conducted. However, that the logic values of the above control signal corresponding to the conduction status of the switch circuits is not used to limit the disclosure. In addition, when the switch circuit 620_1 is conducted, the power stages 610_1 and 610_2 are configured in series; when the switch circuit 620_1 is not conducted, the power stages 610_1 and 610_2 are configured in parallel.

In this embodiment, the rectifier circuit 112 is a reconfigurable RF-to-DC power stage circuit. When each switch circuit is conducted, since each power stage is connected in series, the maximum number of power stages of the rectifier circuit 112 may be 6. Compared with a traditional fixed-stage Dixon rectifier, this architecture uses the control signal Vctrl to control the switching of the switch circuit to adjust the power stage. Therefore, an appropriate stage may be selected according to different distances to harvest energy for a subsequent load end (such as an electronic paper display apparatus) to use. In addition, each power stage will not be completely unused due to the adjustment of the number of stages. That is to say, the minimum number of power stages of the rectifier circuit 112 is 1. Therefore, the efficiency of use of the elements may be fully optimized.

Figure 4A:
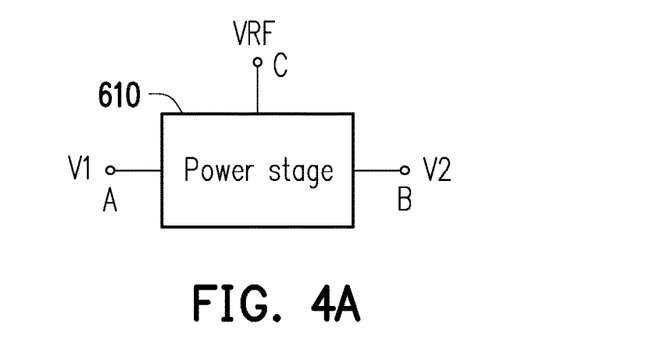
FIG. 4A illustrates a schematic block diagram of a power stage according to an embodiment of the disclosure.
Figure 4B:
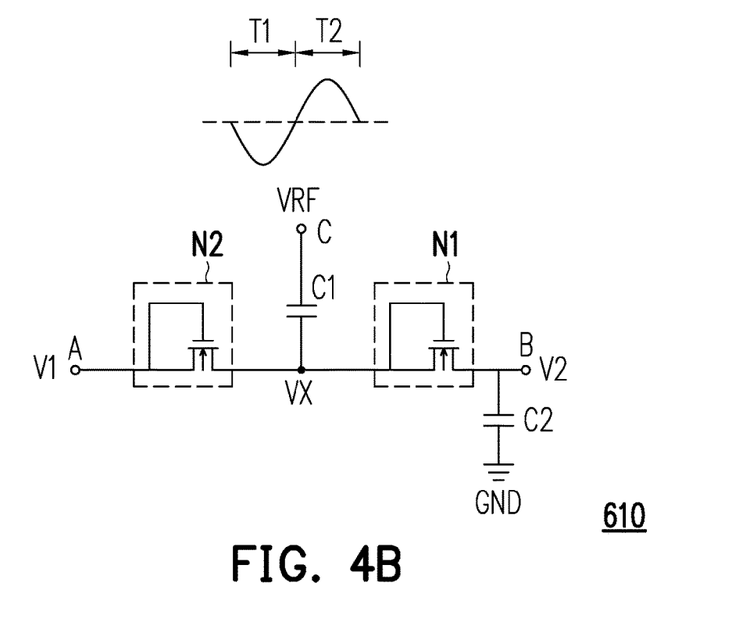
FIG. 4B illustrates a schematic circuit diagram of the power stage of the embodiment of FIG. 4A.

FIG. 4A illustrates a schematic block diagram of a power stage according to an embodiment of the disclosure. FIG. 4B illustrates a schematic circuit diagram of the power stage of the embodiment of FIG. 4A. Referring to FIGS. 4A and 4B, a power stage 610 of this embodiment includes a first end A, a second end B, and a third end C. The first end A of the power stage 610 is coupled to a previous-stage switch circuit (a first switch circuit). The second end B of the power stage 610 is coupled to a next-stage switch circuit (a second switch circuit). The third end C of the power stage 610 is coupled to the radio frequency signal VRF.

Taking the power stage 610_3 of FIG. 3 as an example, a first end of the power stage 610_3 is coupled to the previous-stage switch circuit 620_2. A second end of the power stage 610_3 is coupled to the next-stage switch circuit 620_3. A third end of the power stage 610_3 is coupled to the radio frequency signal VRF. The switch circuit 620_2 and the switch circuit 620_3 are two adjacent switch circuits.

When a previous-stage switch circuit is conducted, the power stage 610 receives an input voltage V1 via the first end A. The input voltage V1 is, for example, the voltage output by a previous-stage power stage. If the power stage 610 is the first power stage 610_1, the first end A is coupled to a reference voltage, such as a ground voltage GND, as shown in FIG. 3. The power stage 610 outputs an output voltage V2 via the second end B. The third end C of the power stage 610 is used to receive the radio frequency signal VRF.

Specifically, the power stage 610 includes a first transistor N1, a second transistor N2, a first capacitor C1, and a second capacitor C2. The first transistor N1 and the second transistor N2 are coupled in series to perform an AC-to-DC conversion operation. The first transistor N1 and the second transistor N2 are implemented by, for example, native transistors, such as n-type MOSFET (NMOS), which has a characteristic of a low threshold voltage (almost zero). When the radio frequency signal VRF is in a negative half period T1, current flows from a ground end to the first end A to charge the first capacitor C1. When the radio frequency signal VRF is in a positive half period T2, since the first capacitor C1 stores charge and voltage across capacitor cannot be suddenly changed, a node voltage VX rises, thereby charging the second capacitor C2 to generate the output voltage V2.

In this embodiment, since the first transistor N1 and the second transistor N2 have the characteristic of a low threshold voltage, losing too much energy in the process of converting the AC radio frequency signal VRF to the DC output voltage V2 may be avoided. In addition, NMOS used to realize the first transistor N1 and the second transistor N2 may be directly implemented in a complementary metal-oxide-semiconductor (CMOS) process without additional photomasks added, which not only lowers the cost but also makes integration easier.

Figure 5A:
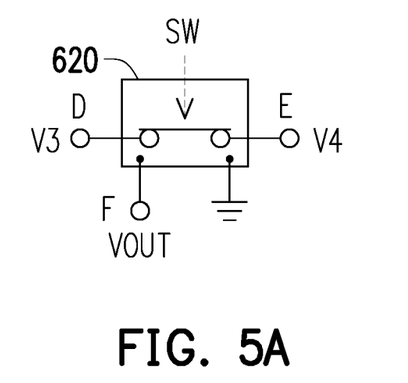
FIG. 5A illustrates a schematic block diagram of a switch circuit according to an embodiment of the disclosure.
Figure 5B:
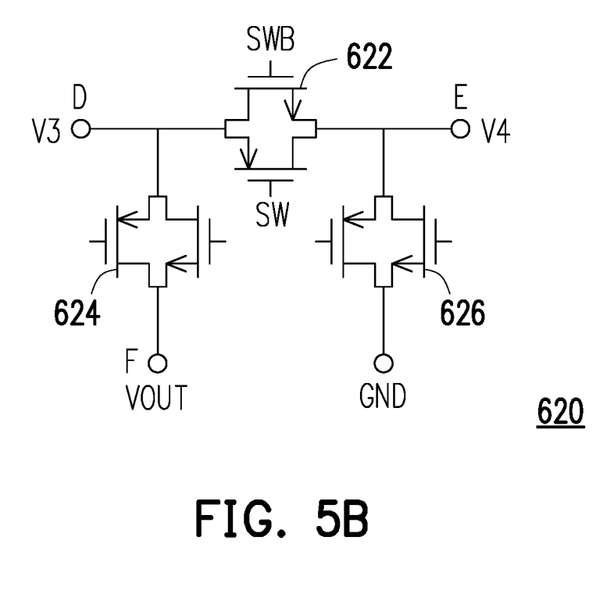
FIG. 5B illustrates a schematic circuit diagram of the switch circuit of the embodiment of FIG. 5A.

FIG. 5A illustrates a schematic block diagram of a switch circuit according to an embodiment of the disclosure. FIG. 5B illustrates a schematic circuit diagram of the switch circuit of the embodiment of FIG. 5A. Referring to FIGS. 5A and 5B, a switch circuit 620 of this embodiment includes a first end D, a second end E, a third end F, and a control end. The first end D of the switch circuit 620 is coupled to a previous-stage power stage (a first power stage). The second end E of the switch circuit 620 is coupled to a next-stage power stage (a second power stage). The third end F of the switch circuit 620 is coupled to the output voltage VOUT of the rectifier circuit 112. The control end of the switch circuit 620 is coupled to a control signal SW.

Taking the switch circuit 620_3 in FIG. 3 as an example, a first end of the switch circuit 620_3 is coupled to the previous-stage power stage 610_3. A second end of the switch circuit 620_3 is coupled to the next-stage power stage 610_4. A third end of the switch circuit 620_3 is coupled to the output voltage VOUT of the rectifier circuit 112. The power stage 610_3 and the power stage 610_4 are two adjacent power stages.

As shown in FIG. 5B, the switch circuit 620 includes transmission gates 622, 624, and 626. The control signal SW and a control signal SWB are used to control the conduction status of the transmission gates 622, 624, and 626, and the control signal SWB is an inverted signal of the control signal SW. When the transmission gate 622 is conducted, the transmission gates 624 and 626 are not conducted, so that two adjacent power stages coupled to the switch circuit 620 may be configured to be coupled in series. Therefore, an input voltage V3 may be transmitted from the first end D to the third end F to serve as output voltage V4. The input voltage V3 is, for example, the voltage output by a previous-stage power stage. On the other hand, when the transmission gate 622 is not conducted, the transmission gates 624 and 626 are conducted, so that two adjacent power stages coupled to the switch circuit 620 may be configured to be coupled in parallel.

In this embodiment, when the control signal SW is logic 0, the transmission gate may be controlled to be conducted; when the control signal SW is logic 1, the transmission gate may be controlled not to be conducted. However, that the logic values of the above control signal corresponding to the conduction status of the transmission gate is not used to limit the disclosure.

Figure 6:
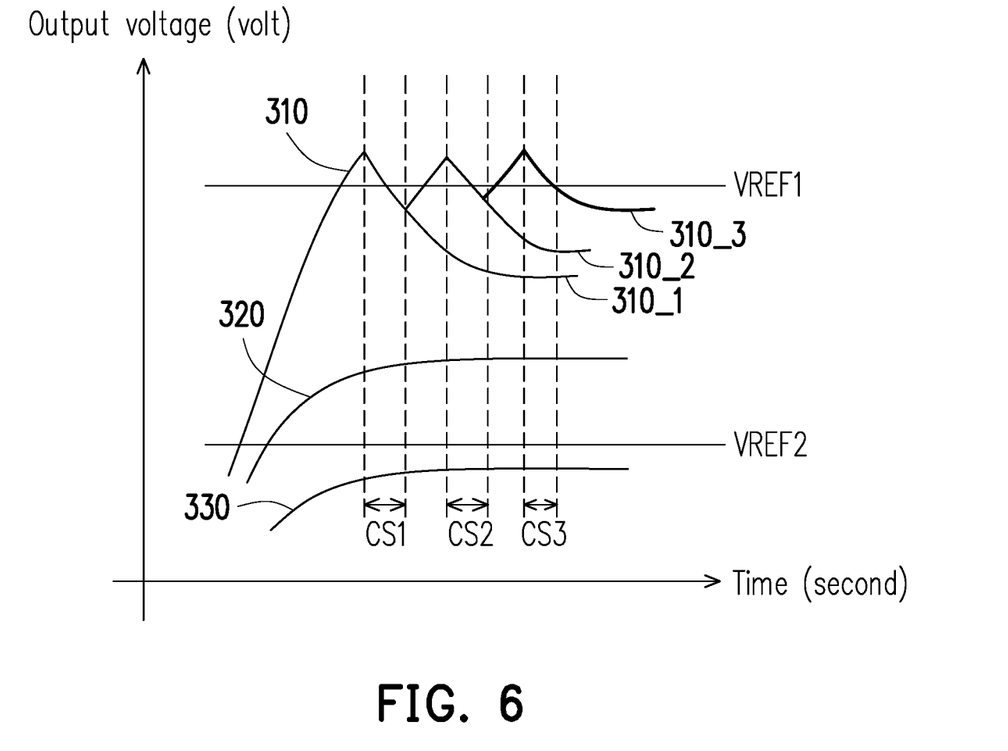
FIG. 6 illustrates a schematic diagram of output control of automatic configuration switching according to an embodiment of the disclosure.

FIG. 6 illustrates a schematic diagram of output control of automatic configuration switching according to an embodiment of the disclosure. FIG. 6 shows the curves of different output voltages versus time. Referring to FIGS. 1 to 3 and 6, when the energy of the radio frequency signal VRF is too large, if the controller circuit 114 does not switch the power stages of the rectifier circuit 112 to a configuration with a smaller equivalent stage number, the output voltage VOUT is an overvoltage, thereby rendering the system coupled to the radio frequency rectifier circuit 110 useless. Therefore, the controller circuit 114 of this embodiment may switch the power stages of the rectifier circuit 112 to an equivalent stage number according to the energy value of the radio frequency signal VRF.

Table 1 shows the corresponding relationship between the output voltage values and the equivalent stage numbers according to the embodiment of FIG. 6:

TABLE 1

| Energy of radio frequency signal | Output voltage curve | Equivalent stage number |
| --- | --- | --- |
| Very low | 330 | 6 |
| Low | 320 | 6 |
| Medium | 310_1 | 3 |
| High | 310_2 | 2 |
| Very high | 310_3 | 1 |

In Table 1, a radio frequency signal with higher energy corresponds to a higher output voltage, and a higher output voltage corresponds to a smaller equivalent stage number. Conversely, a radio frequency signal with lower energy corresponds to a lower output voltage, and a lower output voltage corresponds to a larger equivalent stage number. In addition, a radio frequency signal with higher energy might indicate that the radio frequency rectifier circuit 100 is closer to the radio frequency signal source. Conversely, a radio frequency signal with lower energy might indicate that the radio frequency rectifier circuit 100 is farther away from the radio frequency signal source.

In FIG. 6, when the output voltage VOUT has not exceeded a first default value VREF1, the controller circuit 114 maintains the power stages of the control rectifier circuit 112 at a configuration with the largest equivalent stage number to derive the most energy. For example, when the initial voltage of the output voltage VOUT is less than the first default value VREF1 (that is, curves 320 and 330), the controller circuit 114 controls all the switch circuits 620_1 to 620_5 to be conducted, so that the equivalent stage number of the power stages of the rectifier circuit 112 is 6. Therefore, even when the energy provided by an external radio frequency signal source is low, the radio frequency rectifier circuit 100 may derive relatively more energy from the radio frequency signal VRF through maintaining the configuration of the largest equivalent stage number.

In addition, in this embodiment, when the output voltage VOUT is greater than or equal to a second default value VREF2 (that is, the curve 320), the controller circuit 114 controls all the switch circuits 620_1 to 620_5 to be conducted, too. The second default value VREF2 is less than the first default value VREF1. Conversely, when the output voltage VOUT is less than the second default value VREF2 (that is, the curve 330), the controller circuit 114 controls all the switch circuits 620_1 to 620_5 to be conducted, too.

On the other hand, if the output voltage VOUT exceeds the first default value VREF1, the power stages of the rectifier circuit 112 are switched to a second smallest equivalent stage number to reduce the output voltage VOUT, such as curves 310, 310_1, 310_2, and 310_3. Specifically, when the initial voltage of the output voltage VOUT is greater than or equal to the first default value VREF1 (that is, the curve 310), the controller circuit 114 controls part of the switch circuits to be conducted during an equivalent stage number change period CS1 to reduce the output voltage VOUT and allow the output voltage VOUT to be lower than the first default value VREF1, such as the curve 310_1. In this embodiment, the controller circuit 114 controls the switch circuits 620_1, 620_2, 620_4, and 620_5 to be conducted, for example, and adjusts the equivalent stage number of the power stages of the rectifier circuit 112 to 3 to reduce the output voltage V OUT.

After a period of time, if the output voltage VOUT may be continuously lower than the first default value VREF1, the equivalent stage number of the power stages of the rectifier circuit 112 may be maintained at 3. After a period of time, if the output voltage VOUT rises again and is higher than the first default value VREF1 (that is, the curve 310_2), the controller circuit 114 reduces the conduction number of the switch circuits to reduce the output voltage VOUT. For example, the controller circuit 114 may control the switch circuits 620_1, 620_3, and 620_5 to be conducted during an equivalent stage number change period CS2 to adjust the equivalent stage number of the power stages of the rectifier circuit 112 to 2, so as to reduce the output voltage VOUT once again and allow the output voltage VOUT to be lower than the first default value VREF1.

Similarly, after a period of time, if the output voltage VOUT may be continuously lower than the first default value VREF1, the equivalent stage number of the power stages of the rectifier circuit 112 may be maintained at 2. After a period of time, if the output voltage VOUT rises again and is higher than the first default value VREF1 (that is, the curve 310_3), the controller circuit 114 reduces the conduction number of the switch circuits to reduce the output voltage VOUT. For example, the controller circuit 114 may control all the switch circuits not to be conducted during an equivalent stage number change period CS3, and the equivalent stage number of the power stages of the rectifier circuit 112 may be adjusted to 1, so that the output voltage VOUT may be reduced once again and be lower than the first default value VREF1. Under the architecture of the equivalent stage number adjusted to 1, through the power stage 610_6, the rectifier circuit 112 converts the radio frequency signal VRF into the direct-current voltage VDC serving as the output voltage VOUT.

That is to say, in this embodiment, when the output voltage VOUT changes up and down from the first default value VREF1 and is greater than or equal to the first default value VREF1, the controller circuit 114 reduces the conduction number of the switch circuits and adjusts the equivalent stage number of the power stages of the rectifier circuit 112 to reduce the output voltage VOUT.

Figure 7:
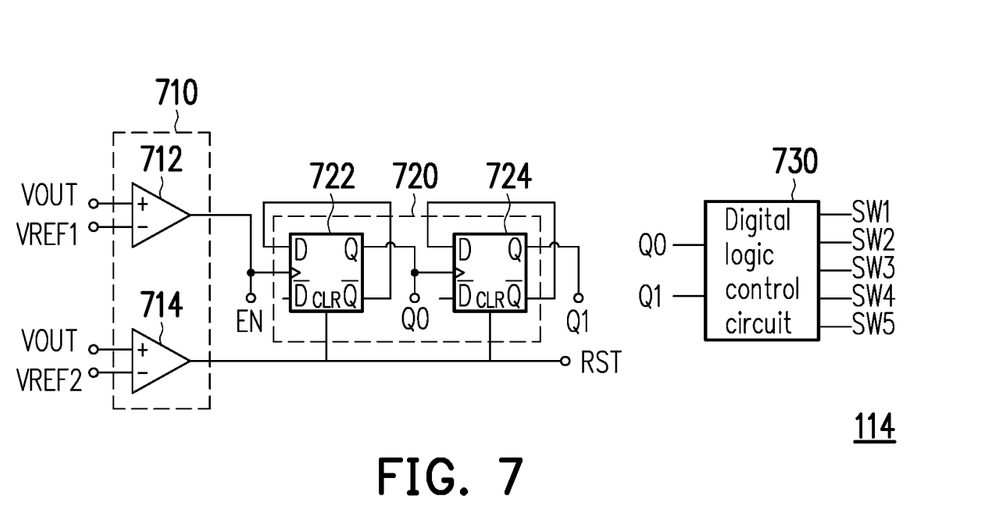
FIG. 7 illustrates a schematic diagram of a controller circuit of the embodiment of FIG. 2.

FIG. 7 illustrates a schematic diagram of a controller circuit of the embodiment of FIG. 2. Referring to FIGS. 2 and 7, the controller circuit 114 of this embodiment includes a comparator circuit 710, a counter circuit 720, and a digital logic control circuit 730.

The comparator circuit 710 is used to compare the output voltage VOUT with at least one default value to output at least one comparison signal EN or RST. The comparator circuit uses the comparison signal EN or RST to trigger or reset the counter circuit 720. The counter circuit 720 is coupled to the comparator circuit 710 for outputting count signals Q0 and Q1.

Specifically, the comparator circuit 710 includes a first comparator 712 and a second comparator 714. The counter circuit 720 include D-flip flops 722 and 724. The first comparator 712 is used to compare the output voltage VOUT with the first default value VREF1 to output the comparison signal EN. When the output voltage VOUT is greater than or equal to the first default value VREF1, the first comparator 712 outputs a high-level comparison signal EN to trigger the D-flip flops 722 and 724 of the counter circuit 720, and the counter circuit 720 starts to count upwards by 1. When the output voltage VOUT is less than the first default value VREF1, the first comparator 712 outputs a low-level comparison signal EN and does not trigger the counter circuit 720.

The second comparator 714 is used to compare the output voltage VOUT with the second default value VREF2 to output the comparison signal RST. When the output voltage VOUT is greater than or equal to the second default value VREF2, the second comparator 714 outputs a high-level comparison signal RST to reset the counter circuit 720 so that the data outputs Q0 and Q1 of the D-flip flops 722 and 724 are 0. When the output voltage VOUT is less than the second default value VREF2, the second comparator 714 outputs a low-level comparison signal RST and does not reset the counter circuit 720. Therefore, the data outputs Q0 and Q1 of the D-flip flops 722 and 724 may be maintained at 0.

Next, the digital logic control circuit 730 is coupled to the counter circuit 720. The digital logic control circuit 730 is used to output the control signals SW1 to SW5 according to the count signals Q0 and Q1. Table 2 shows the corresponding relationship between output equivalent stage numbers NEFF, the count signals Q0 and Q1, and the control signals SW1 to SW5 according to an embodiment of the disclosure:

TABLE 2

| NEFF | Q0 | Q1 | SW1 | SW2 | SW3 | SW4 | SW5 |
|---|---|---|---|---|---|---|---|
| 6 | 0 | 0 | 0 | 0 | 0 | 0 | 0 |
| 3 | 0 | 1 | 0 | 0 | 1 | 0 | 0 |
| 2 | 1 | 0 | 0 | 1 | 0 | 1 | 0 |
| 1 | 1 | 1 | 1 | 1 | 1 | 1 | 1 |

Bits of the corresponding control signal SW1 to SW5 are decoded from the values of the count signals Q0 and Q1 output by the counter circuit 720 through the digital logic control circuit 730 to control the conduction status of the switch circuits so as to adjust the equivalent stage number NEFF of the power stages. In this embodiment, sufficient teaching, suggestions, and implementation description of the implementation of the digital logic control circuit may be obtained from the common knowledge in the technical field.

In summary, in the embodiments of the disclosure, the rectifier circuit may switch between configurations according to different control signals to optimize energy transmission in response to different load requirements. In controlling the automatic configuration switching, a more appropriate configuration may be automatically selected according to the radio frequency energy of different distances, so that the output voltage does not exceed the default value for the next-stage circuit to use. In addition, the transistors in the power stages have the characteristic of a low threshold voltage, so losing too much energy in the process of converting the AC radio frequency signal to the DC output voltage may be avoided.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. A radio frequency rectifier circuit, comprising:
a rectifier circuit, adapted for receiving a radio frequency signal and converting the radio frequency signal into a direct-current voltage serving as an output voltage, wherein the rectifier circuit comprises a plurality of power stages and a plurality of switch circuits, and each of the switch circuits is coupled between two of the power stages; and
a controller circuit, coupled to the rectifier circuit, adapted for outputting a control signal according to a value of the output voltage to control a conduction number of the switch circuits,
wherein in response to an initial voltage of the output voltage is greater than or equal to a first default value, the controller circuit controls a part of the switch circuits to be conducted to reduce the output voltage,
wherein in response to the initial voltage of the output voltage is less than the first default value, the controller circuit controls all of the switch circuits to be conducted.

2. The radio frequency rectifier circuit according to claim 1, wherein when the output voltage changes up and down from the first default value and is greater than or equal to the first default value, the controller circuit reduces the conduction number of the switch circuits to reduce the output voltage.

3. The radio frequency rectifier circuit according to claim 1, wherein when the output voltage is greater than or equal to a second default value, the controller circuit controls all of the switch circuits to be conducted, wherein the second default value is less than the first default value.

4. The radio frequency rectifier circuit according to claim 3, wherein when the output voltage is less than the second default value, the controller circuit controls all of the switch circuits to be conducted.

5. The radio frequency rectifier circuit according to claim 1, wherein each of the power stages comprises a first end, a second end, and a third end, the first end of the power stage is coupled to a first switch circuit, the second end of the power stage is coupled to a second switch circuit, and the third end of the power stage is coupled to the radio frequency signal, wherein the switch circuits comprise the first switch circuit and the second switch circuit, and the first switch circuit and the second switch circuit are two adjacent switch circuits.

6. The radio frequency rectifier circuit according to claim 5, wherein each of the power stages comprises a plurality of native transistors coupled in series to perform an AC-to-DC conversion operation.

7. The radio frequency rectifier circuit according to claim 1, wherein each of the switch circuits comprises a first end, a second end, a third end, and a control end, the first end of the switch circuit is coupled to a first power stage, the second end of the switch circuit is coupled to a second power stage, the third end of the switch circuit is coupled to the output voltage, and the control end of the switch circuit is coupled to the control signal, wherein the power stages comprise the first power stage and the second power stage, and the first power stage and the second power stage are two adjacent power stages.

8. The radio frequency rectifier circuit according to claim 1, wherein the controller circuit comprises:
a comparator circuit, adapted for comparing the output voltage with at least one default value to output at least one comparison signal;
a counter circuit, coupled to the comparator circuit, adapted for outputting a count signal, wherein the comparator circuit uses the comparison signal to trigger or reset the counter circuit; and
a digital logic control circuit, coupled to the counter circuit, adapted for outputting the control signal according to the count signal.

9. An electronic paper display apparatus, comprising the radio frequency rectifier circuit according to claim 1, wherein the radio frequency rectifier circuit receives the radio frequency signal and converts the radio frequency signal into the direct-current voltage serving as an operating voltage of the electronic paper display apparatus.

* * * * *